Aug. 23, 1966 P. H. MATHES 3,268,825
ANODE DISSIPATION LIMITER
Filed July 12, 1963
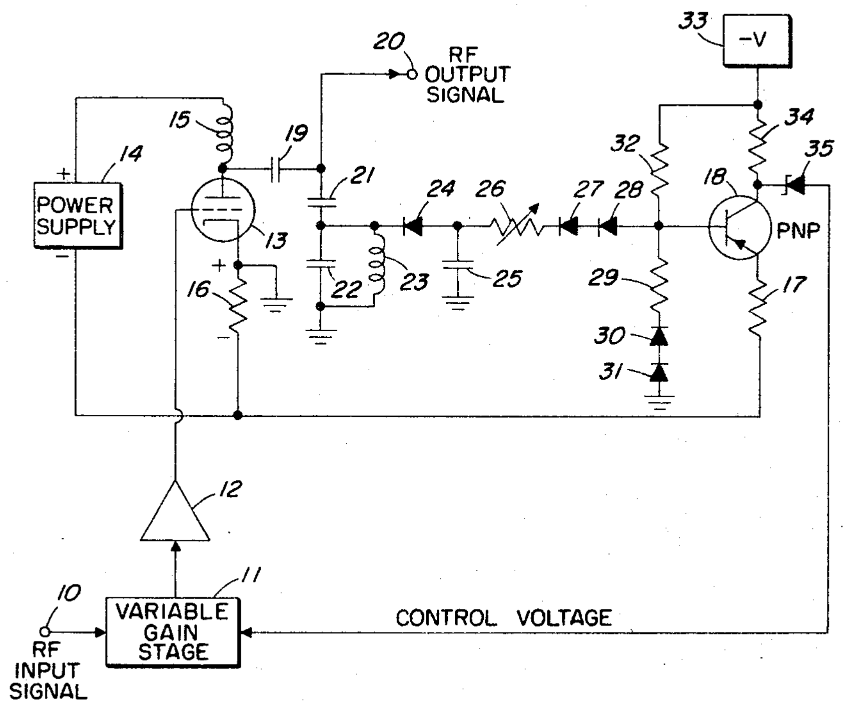
INVENTOR.
PHILIP H. MATHES
BY Moody and Kintzinger
ATTORNEYS 3,268,825

ANODE DISSIPATION LIMITER

Philip H. Mathes, Cedar Rapids, Iowa, assignor to Collins Radio Company, Cedar Rapids, Iowa, a corporation of Iowa Filed July 12, 1963, Ser. No. 294,560
9 Claims. (Cl. 330—3)

This invention relates in general to automatic control circuits, and more particularly to a control circuit providing a controlling voltage based on a plate current sample and a plate RF voltage sample in a stage of a multistage power amplifier for preventing excessive anode dissipation in the stage subject to protection.

Various anode dissipation controlling systems of existing art include temperature sensing and responsive anode dissipation controlling systems, and on the other hand, anode dissipation protective systems responsive only to plate current measurements for overload protection. Temperature sensors used in temperature sensing anode dissipation limit controlling systems generally take the form of a thermocouple or a bimetallic strip and other such devices. These compare the heat radiated from the anode, or the temperature of the anode cooling air stream, and a standard heating ambient reference or a heat sink reference, and the temperature differential measured is a measure of anode dissipation used for control when the temperature differential is excessive. Although this method to some degree appears to be ideal in principle, it does fall short of the desired practical optimum as a result of variations in ambient temperature along with the varying effects of altitude and barometric changes.

Existing current overload protective systems for controlling anode dissipation are limited by at least three factors including a dependence on and sensing solely a continuing current for developing the control signal of the system. The second limiting factor is the inherently slow action of such current overload protective systems, and the third limiting factor is a resulting go-no-go type operation with only complete shut down as its controlling feature.

It is, therefore, a principal object of this invention to provide anode dissipation limiting as a result of both plate current and RF voltage levels in a stage of a multistage power amplifier.

Another object is to provide such a system of anode dissipation limiting control responsive to combined measurements of both plate current and plate RF voltage signal levels dependent only on the assumption that adequate cooling air is being supplied under the most adverse operational conditions of ambient temperature and altitude.

Features of this invention useful in accomplishing the above objects include the taking of both a plate current sample and a plate RF voltage sample with both applied to a signal combining transistor amplifier as voltages proportional to plate current and plate RF voltage. Here they provide a transistor amplifier differential output control voltage whenever the plate current and RF voltage samples indicate a condition of excessive anode dissipation. The RF voltage output of the tube is provided with a RF voltage sample taking connection through a capacitive divider to a series detector including a coil, a diode, and a capacitor. The detector develops a D.C. signal subsequently fed through a combined voltage divider and biasing network to the base of the control circuit transistor amplifier. Voltage differential developed by current flow through a cathode resistor, as the plate current indicating sample, is applied to the emitter of the transistor amplifier. The output electrode of the transistor is connected through a zener diode for application of transistor developed output signals as a gain controlling voltage input to a variable gain stage of the multistage linear power amplifier. This varies the gain of the RF signal input through the variable gain stage for obtaining a controlled output fed to and through a driver amplifier of the multistage linear power amplifier system. This controls the RF signal level applied to the grid of the amplifier tube being provided protection and limits anode dissipation in that tube. Various diodes in the voltage dividing and biasing network are used, respectively, as gating diodes and for temperature compensation in transistor voltage biasing. In the transistor output control voltage line the zener diode provides for offsetting residual collector to ground voltage to the variable gain stage. This gives some measure of design leeway in plate current and plate voltage sample slope variations in the system, and the zener diode may, with good or properly compensated voltage sample slopes, be eliminated in a satisfactory anode dissipation limiting control system.

A specific embodiment representing what is presently regarded as the best mode of carrying out the invention is illustrated in the accompanying drawing.

Referring to the drawing:

The RF input signal is passed through input terminal 10 to and through variable gain stage 11 to driver amplifier 12 and its associated broad band stages (not shown). The RF output signal from the driver amplifier 12 is applied to the grid of power amplifier tube 13. In a working embodiment of the device, tube 13, as a final power amplifier, is a 4CX 10,000 tetrode power amplifier, and the control voltage is fed to the first of four stages in a 10K watt linear power amplifier (detail not shown). Power supply 14 has a positive voltage outlet connected through coil 15 to the plate of power amplifier tube 13 and the power supply has a relatively negative voltage outlet connected through resistor 16 to the cathode of power amplifier 13. The same relatively negative voltage output of floating power supply 14 is also connected through resistor 17 to the emitter of PNP transistor 18, and the cathode of power amplifier tube 13 is connected to ground.

The plate of power amplifier tube 13 is connected through capacitor 19 to RF output signal terminal 20. The plate of power amplifier tube 13 is also connected through capacitor 19 to a capacitive voltage divider including capacitors 21 and 22 serially connected between capacitor 19 and ground. The RF output voltage signal sample developed at the common junction of capacitors 21 and 22 is fed to a series detector including, serially, coil 23 connected between the common junction of capacitors 21 and 22 and ground, diode 24 with its cathode connected to the common junction of capacitors 21 and 22, and capacitor 25 connected between the anode of diode 24 and ground. The common connection of the anode of diode 24 and capacitor 25 is connected through, serially, adjustable resistor 26, and diodes 27 and 28 to the base of PNP transistor 18. Diodes 27 and 28 are serially connected with the cathodes toward resistor 26 and anodes toward the base of transistor 18.

The D.C. voltage level applied to the base of transistor 18 resulting from the output of the detector is adjusted by means of a resistor divider including adjustable resistor 26 and the resistor 29 connected between the common connection of the anode of diode 28 and the base of transistor 18, and at the other end through, serially, diodes 30 and 31 to ground. Resistor 29 and diodes 30 and 31 also are part of a transistor 18 voltage biasing network including resistor 32 connected between minus voltage supply 33 and the common junction of the anode of diode 28 and the base of transistor 18. The diodes 30 and 31, serially connected, cathodes toward resistor 29 and anodes toward ground, provide temperature compensation for the voltage biasing network. The voltage biasing network also includes resistor 34 connected between the minus voltage supply 33 and the collector of transistor 18. Any control voltage signal developed at the collector of transistor 18 is applied to zener diode 35 and when above the threshold level of zener diode 35 through to a control grid (not shown) of the variable gain stage 11.

During operation whenever an increase in power amplifier tube 13 plate current is not accompanied by a proportionate increase in plate RF voltage, the power amplifier anode dissipation limiter circuit provides a negative D.C. control voltage bias to a control electrode (i.e. control grid not shown) in variable gain stage 11. This automatically reduces the RF signal applied to the control grid of power amplifier tube 13 and results in a substantially fixed predetermined ratio of RF voltage swing-to-D.C. voltage plate current indicating level as a result of the controlled reduction in plate current. With this system resistor 26 is adjusted so that the power amplifier anode dissipation limiter system provides threshold control voltage to the variable gain stage 11 whenever the power amplifier tube 13 is brought up to its rated power output.

Diodes 27 and 28 provide a certain amount of voltage delay for the detector circuit, and a resultant negative D.C. bias proportional to the RF voltage sample is applied at the base of PNP transistor 18. It should be noted that a NPN transistor could replace PNP transistor 18 in such an anode dissipation limiter with appropriate corresponding variations in bias voltage and reversed orientation of diodes as required in providing the same operational results. A sample of the power amplifier tube plate current developed across resistor 16 is applied through gain stabilization resistor 17 to the emitter of PNP transistor 18. This emitter voltage is proportional to the power amplifier 13 plate current flow through resistor 16 with the relatively negative terminal of floating power supply 14 and the emitter of transistor 18 being driven increasingly negative with respect to ground with increasing plate current flow through resistor 16 since the junction of resistor 16 and the cathode of tube 13 is connected to ground. Thus, emitter voltage of transistor 18 is proportional to the power amplifier 13 plate current and the voltage applied to the base of transistor 18 is proportional to the power amplifier plate RF voltage. When plate current increases, the plate RF voltage also normally increases provided the power amplifier is tuned and loaded properly. As plate current increases the voltage developed across resistor 16 increases and the voltage applied to the emitter of transistor 18 is driven increasingly negative, and with corresponding increase in plate RF voltage in power amplifier 13 the base of transistor 18 is driven more negative and the transistor continues to operate with essentially the same base current.

With the adjustments and conditions outlined above, the transistor normally operates in the saturated region of its characteristic curve with the collector voltage substantially zero with respect to ground. Then as long as the emitter to base voltage differential remains substantially the same no negative voltage is developed at the anode of zener diode 35. Should, however, for any reason, an increase in power amplifier plate current be not accompanied by a corresponding increase in plate RF voltage, the transistor base voltage becomes less negative with respect to the emitter voltage. This results in the transistor 18 no longer operating in the saturated region and a voltage drop is developed between the collector and the base. Then, as the base voltage becomes more positive with respect to the emitter, transistor 18 approaches cutoff, and the negative voltage at the collector approaches the minus voltage level of voltage supply 33. While this is occurring with the collector voltage becoming more negative, zener diode 35 is biased to conduction and a negative D.C. bias is applied through the control voltage line to the variable gain stage 11. Thus it appears that power amplifier 13 drive is reduced and any substantial increase in power amplifier plate current not accompanied by a corresponding increase in plate RF voltage is prevented. It should be noted that this system operates under the assumption that there is always adequate cooling air being supplied under the most adverse conditions of ambient temperature and altitude.

In a working embodiment of the anode dissipation limiter system use of a resistor with a value of one ohm as resistor 16 offered a very low source impedance to the emitter of PNP transistor 18 for developing the plate current D.C. bias voltage sample. A larger resistance value, for example 10 ohms, could be used for resistor 16 without adversely affecting operation of the anode dissipation limiting system. Further, in a working embodiment, with the transistor 18 normally saturated, the collector to ground voltage is nominally minus one volt. With increasing plate current and a resulting increase of negative emitter to ground voltage, and without a corresponding increase in RF plate voltage the collector to ground voltage becomes increasingly negative towards the negative voltage of voltage supply 33. These are the conditions giving rise to excessive anode dissipation. When, on the other hand, plate current increases and the RF voltage on the plate correspondingly increases, as it normally would, transistor 18 base to emitter differential voltage bias stays substantially constant with the transistor continuing to operate in its normally saturated region.

Various components and values used in an anode dissipation limiter, for a 4CX 10,000 tetrode power amplifier tube 13, providing control voltage to the first of four stages in a ten kilowatt linear power amplifier (detail not shown) include the following:

| | |
|---|---|
| Power amplifier tube 13 --- | 4CX 10,000d. |
| Power supply 14 --------- | 7,500 volts differential between the positive and negative terminals shown. |
| Resistor 16 -------------- | 1 ohm. |
| PNP transistor 18 -------- | 2N328A. |
| Capacitor 21 ------------ | 5 pf. |
| Capacitor 22 ------------ | 250 μf. |
| Coil 23 ----------------- | 2 μh. |
| Diode 24 ---------------- | FD 100 (Fairchild type). |
| Capacitor 25 ------------ | .01 μf. |
| Adjustable resistor 26 ----- | 175K ohms. |
| Diodes 27, 28, 30, and 31 -- | 1N457. |
| Resistor 29 -------------- | 3.48K ohms. |
| Resistor 32 -------------- | 72.5K ohms. |
| Voltage supply 33--------- | —20 volts. |
| Resistor 34 -------------- | 10K ohms. |
| Zener diode 35 ----------- | 1N753A. |

Whereas this invention is here illustrated and described with respect to a single embodiment thereof, it should be realized that various changes may be made without departing from the essential contributions to the art made by the teachings hereof.

I claim:

1. In an anode dissipation limiter for a power amplifier tube stage of an RF power amplifier including RF signal varying means subject to control by a control voltage: a multi-element amplifying device; voltage biasing means connected to elements of said multi-element amplifying device; means for taking an RF plate voltage sample and developing a D.C. bias representing the plate RF voltage of the power amplifier tube stage at an element of said multi-element amplifying device; means for taking a plate current sample and developing a D.C. bias representing the D.C. plate current sample of the power amplifier tube stage at another element of said multi-element amplifying device; said amplifying device having an output element connected to the RF signal varying means for application of control output voltage developed at the output element to the RF signal varying means; wherein said means for taking an RF plate voltage sample and developing a D.C. bias representing the RF plate voltage of the power amplifier stage at an element of said multi-element amplifying device includes: a first voltage divider; a detector; and a second voltage divider; with said first voltage divider an RF capacitive voltage divider connected between the plate of the power amplifier tube stage and said detector; with the detector connecting the RF voltage divider and the second voltage divider; and with the second voltage divider being a D.C. voltage bias resistance divider having a connection to an element of said multi-element amplifying device.

2. The anode dissipation limiting system of claim 1, wherein said RF signal varying means is a variable gain stage of a multistage amplifier.

3. The anode dissipation limiting system of claim 1, wherein said RF capacitive voltage divider includes two capacitors connected between the RF output signal path from the RF amplifier tube stage and ground; with the series detector including, serially, a coil connected between the common junction of the capacitors of the capacitive voltage divider and ground, a diode connected on one side to the common junction of the capacitors, and on the other side through a capacitor to ground and also to the D.C. voltage bias resistance divider; with this second voltage divider including, an adjustable resistor, two diodes serially connected cathode of one diode to anode of the other diode between the adjustable resistor and an element of said multi-element amplifying device, a portion of said voltage biasing means with impedance means including two additional diodes serially connected cathode of one to anode of the other between the element of said multi-element amplifying device and ground; and with said voltage biasing means also including a voltage supply; and additional impedance means between two of the elements of said multi-element device; and with further impedance means between said voltage supply and the output element of said multi-element amplifying device.

4. The anode dissipation limiting system of claim 1, including a zener diode connected between said output element and the RF signal varying means.

5. The anode dissipation limiting system of claim 1, wherein said RF power amplifier is a multistage RF power amplifier; with said RF signal varying means being a variable gain stage of the multistage power amplifier; including driver amplifier and broad band staging; with the RF input signal being applied to said variable gain stage; said control output voltage developed at the output element of said multi-element amplifying device being applied back to the variable gain stage; and with the RF output signal being taken from the plate of the power amplifier tube stage.

6. The anode dissipation system of claim 1, wherein said detector is a series detector connecting the RF voltage divider and the second voltage divider.

7. The anode dissipation limiting system of claim 1, wherein said multi-element amplifying device is a solid state device, the means for taking an RF voltage plate sample is connected to a first electrode of the solid state device, the means for taking a plate current sample is connected to a second electrode of the solid state device, and the output element is a third electrode of the solid state device.

8. The anode dissipation limiting system of claim 7, wherein said solid state device is a PNP transistor with its base the first electrode, its emitter the second electrode, and its collector the third electrode of the solid state device.

9. The anode dissipation limiting system of claim 7, wherein said means for taking a plate current sample and developing a D.C. bias representing the plate current sample of the power amplifier tube stage at the second electrode of said multi-element amplifying solid state device includes: a cathode resistor connected to the cathode of said power amplifying tube stage; and a D.C. power supply having a positive connection to the plate of said power amplifier tube stage, and a relatively negative connection through said cathode resistor to the cathode of said power amplifier stage; with the cathode of said power amplifier stage connected to a voltage potential reference; and with the relatively negative terminal of said power supply also connected to the second electrode of said multi-element amplifying solid state device in order that variation in D.C. voltage bias developed with current flow through the cathode resistor will be applied to the second electrode of said multi-element amplifying solid state device.

References Cited by the Examiner

UNITED STATES PATENTS

| | | | |
|---|---|---|---|
| 2,062,691 | 12/1936 | Willging | 325—362 |
| 2,960,661 | 11/1960 | Bratschi | 330—140 X |
| 2,987,629 | 6/1961 | Germain | 307—88.5 |
| 3,102,241 | 9/1963 | Johnstone | 330—51 X |
| 3,182,260 | 5/1965 | Heaton-Armstrong | 328—8 |

OTHER REFERENCES

Korn and Korn, Electronic Analog Computers, McGraw-Hill, New York, 2d edition, 1956, page 253 relied on.

ROY LAKE, *Primary Examiner.*

R. P. KANANEN, N. KAUFMAN, *Assistant Examiners.*